US011888189B2

(12) United States Patent
Fukuma (10) Patent No.: US 11,888,189 B2
(45) Date of Patent: Jan. 30, 2024

(54) FUEL CELL SYSTEM, AND OPERATING METHOD OF FUEL CELL SYSTEM

(71) Applicant: HONDA MOTOR CO., LTD., Tokyo (JP)

(72) Inventor: Kazunori Fukuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/855,892

(22) Filed: Jul. 1, 2022

(65) Prior Publication Data

US 2023/0027958 A1 Jan. 26, 2023

(30) Foreign Application Priority Data

Jul. 13, 2021 (JP) .................................. 2021-115795

(51) Int. Cl.
*H01M 8/04291* (2016.01)
*H01M 8/04082* (2016.01)
*H01M 8/04492* (2016.01)
*H01M 8/1007* (2016.01)
*H01M 8/04537* (2016.01)
*H01M 8/04746* (2016.01)

(52) U.S. Cl.
CPC ... *H01M 8/04291* (2013.01); *H01M 8/04201* (2013.01); *H01M 8/04507* (2013.01); *H01M 8/04552* (2013.01); *H01M 8/04611* (2013.01); *H01M 8/04753* (2013.01); *H01M 8/1007* (2016.02)

(58) Field of Classification Search
CPC ......... H01M 8/04291; H01M 8/04201; H01M 8/04507; H01M 8/04552; H01M 8/04611; H01M 8/04753; H01M 8/1007
See application file for complete search history.

(56) References Cited

U.S. PATENT DOCUMENTS

| | | | |
|---|---|---|---|
| 2005/0136302 A1* | 6/2005 | Shoji ................. | H01M 8/04776 429/444 |
| 2007/0287042 A1* | 12/2007 | Rainville .......... | H01M 8/04955 429/444 |

FOREIGN PATENT DOCUMENTS

JP 2008-251312 10/2008

* cited by examiner

*Primary Examiner* — Stewart A Fraser
(74) *Attorney, Agent, or Firm* — Amin, Turocy & Watson, LLP (57) ABSTRACT

A fuel cell system includes a membrane electrode assembly, an anode-side internal passage, a cathode-side internal passage, an oxygen supply section, and a control device. The oxygen supply section includes a gas circulation passage connected to one end side and the other end side of the cathode-side internal passage, an oxygen supply source connected to the gas circulation passage, and a gas circulation device configured to circulate and flow oxygen gas in any one of one direction and the other direction in the gas circulation passage. The control device switches a flow direction of the oxygen gas by the gas circulation device according to a distribution state of moisture on the cathode electrode of the membrane electrode assembly.

8 Claims, 5 Drawing Sheets

FUEL CELL SYSTEM, AND OPERATING METHOD OF FUEL CELL SYSTEM

CROSS-REFERENCE TO RELATED APPLICATION

Priority is claimed on Japanese Patent Application No. 2021-115795, filed Jul. 13, 2021, the content of which is incorporated herein by reference.

BACKGROUND OF THE INVENTION

Field of the Invention

The present invention relates to a fuel cell system configured to generate power using an electrochemical reaction between hydrogen and oxygen, and an operating method of the fuel cell system.

Description of Related Art

As a fuel cell, a solid polymer type fuel cell is known. The fuel cell employs a membrane electrode assembly (MEA) in which an anode electrode is joined to one surface of a solid polymer electrolyte membrane and a cathode electrode is joined to the other surface. Hydrogen gas that is a fuel gas is supplied to an anode-side internal passage facing the anode electrode of the fuel cell, and an oxidant gas such as air or the like is supplied to a cathode-side internal passage facing the cathode electrode. The hydrogen gas supplied to the anode-side internal passage and oxygen of the oxidant gas supplied to the cathode-side internal passage electrochemically react with each other through the membrane electrode assembly, and generate electric power.

In addition, supplying pure oxygen gas to the cathode electrode instead of air containing impurities such as nitrogen or the like in such a fuel cell is known (for example, see Japanese Unexamined Patent Application, First Publication No. 2008-251312).

In the fuel cell system using such fuel cells, a circulation passage for hydrogen gas is connected to the anode-side internal passage, and a circulation passage for oxygen gas is connected to the cathode-side internal passage. The circulation passage for hydrogen gas is constituted by a supply passage section for hydrogen gas connected to one end side of the anode-side internal passage, and a return passage section for unreacted gas connected to the other end side of the anode-side internal passage. The unreacted hydrogen gas is returned to the supply passage section from the return passage section, and supplied to the anode-side internal passage again. The circulation passage for oxygen gas is constituted by a supply passage section for oxygen gas connected to one end side of the cathode-side internal passage, and a return passage section for unreacted gas connected to the other end side of the cathode-side internal passage. The unreacted oxygen gas is returned to the supply passage section from the return passage section, and supplied to the cathode-side internal passage again. The circulation passage for hydrogen gas is connected to a hydrogen supply source such as a hydrogen tank or the like, and the circulation passage for oxygen gas is connected to an oxygen supply source such as an oxygen tank or the like.

SUMMARY OF THE INVENTION

In such a fuel cell system, the generated water generated at the cathode electrode is used to humidify an electrode surface of the membrane electrode assembly. For this reason, while it is preferable that a moderate amount of moisture remain in the cathode-side internal passage, if a large amount of moisture is biased and retained in a part of the cathode-side internal passage, power generation efficiency in the membrane electrode assembly may decrease.

In particular, in the fuel cell system configured to supply pure oxygen gas to the cathode electrode, when the hydrogen gas passing through the cathode-side internal passage is consumed by the membrane electrode assembly, since there are no impurities such as nitrogen or the like that push the generated water in the cathode-side internal passage out to an outlet side, the generated water is easily biased and retained downstream from the cathode-side internal passage. For this reason, it is desired to devise a fuel cell system capable of suppressing the biased retention of the generated water in the cathode-side internal passage.

An aspect of the present invention is directed to providing a fuel cell system capable of suppressing biased retention of generated water in a cathode-side internal passage, and an operating method of the fuel cell system.

(1) A fuel cell system according to an aspect of the present invention is a fuel system including a membrane electrode assembly (for example, a membrane electrode assembly (11) of an embodiment) having an anode electrode (for example, an anode electrode (11b) of the embodiment) joined to one surface of a solid polymer electrolyte membrane (for example, a solid polymer electrolyte membrane (11a) of the embodiment) and a cathode electrode (for example, a cathode electrode (11c) of the embodiment) joined to other surface of the solid polymer electrolyte membrane; an anode-side internal passage (for example, an anode-side internal passage (12) of the embodiment) facing the anode electrode of the membrane electrode assembly; a cathode-side internal passage (for example, a cathode-side internal passage (14) of the embodiment) facing the cathode electrode of the membrane electrode assembly; a hydrogen supply section (for example, a hydrogen supply section (3) of the embodiment) configured to supply hydrogen gas to the anode-side internal passage; an oxygen supply section (for example, an oxygen supply section (4) of the embodiment) configured to supply oxygen gas to the cathode-side internal passage; and a control device (for example, a control device (5) of the embodiment) configured to control a flow of the oxygen gas in the oxygen supply section, and the fuel cell system being configured to generate electric power using an electrochemical reaction between hydrogen and oxygen passing through the membrane electrode assembly, and the oxygen supply section includes: a gas circulation passage (for example, a gas circulation passage (26) of the embodiment) connected to one end side and other end side of the cathode-side internal passage; an oxygen supply source (for example, an oxygen tank (24) of the embodiment) connected to the gas circulation passage; and a gas circulation device (for example, a pump device (28) of the embodiment) configured to circulate and flow the oxygen gas in any one of the one direction and the other direction in the gas circulation passage, and the control device switches a flow direction of the oxygen gas by the gas circulation device according to a distribution state of moisture at the cathode electrode of the membrane electrode assembly.

According to the configuration of the aspect of the above-mentioned (1), when the oxygen gas flows through the gas circulation passage of the oxygen supply section in the one direction and the oxygen gas is supplied to the cathode electrode, the oxygen gas electrochemically reacts with the hydrogen gas on the side of the anode electrode in the membrane electrode assembly. Here, electric power is taken out between the cathode electrode and the anode electrode, and water is generated on the cathode electrode. While the generated water is basically discharged from the cathode-side internal passage into the gas circulation passage, when the power generation is continued, the generated water is gradually biased and retained on a downstream side of the cathode-side internal passage. Here, the control device switches a flow direction of the oxygen gas by the gas circulation device according to a distribution state of moisture on the cathode electrode of the membrane electrode assembly. Accordingly, the oxygen gas flows through the cathode-side internal passage in a reverse direction, and the biased retention of the generated water in the cathode-side internal passage is resolved.

(2) In the aspect of the above-mentioned (1), the gas circulation device may be constituted by a pump device (for example, a pump device (28) of the embodiment) that is rotatable normally and in reverse direction.

In the case of the aspect of the above-mentioned (2), the flow direction of the oxygen gas in the cathode-side internal passage can be changed by simply switching the rotation direction of the pump device. For this reason, the flow direction of the oxygen gas can be switched by a simple configuration without using a complicated pipeline, a flow channel switching valve, or the like. Accordingly, when this configuration is employed, a structure of the fuel cell system can be simplified.

(3) In the aspect of the above-mentioned (1) or (2), the control device may switch a flow direction of the oxygen gas by the gas circulation device when an accumulated power generation quantity from a reference timing point has become a threshold or more.

In the case of the aspect of the above-mentioned (3), when the power generation is continued, the generated water quantity is also increased according to an increase in accumulated power generation quantity. For this reason, when the accumulated power generation quantity from the reference timing point has become a threshold or more, the generated water can be suppressed from being biased and retained on one side of the cathode-side internal passage by switching the flow direction of the oxygen gas.

(4) In the aspect of the above-mentioned (1) or (2), the fuel cell system may further include a power generation quantity detection unit (for example, a power generation quantity detection unit (50) of the embodiment) configured to detect an accumulated power generation quantity from a reference timing; a generated water storage tank (for example, a first gas-liquid separator (29) of the embodiment) provided in the gas circulation passage and configured to store the generated water flowing out of the cathode-side internal passage; and a generated water quantity detection device (for example, a water level sensor (35) of the embodiment) configured to detect a flow rate of the generated water stored in the generated water storage tank, and the control device may switch a flow direction of oxygen gas by the gas circulation device when a difference between a quantity of the generated water estimated from an accumulated power generation quantity detected by the power generation quantity detection unit and the generated water quantity detected by the generated water quantity detection device has become a threshold or more.

In the case of the aspect of the above-mentioned (4), when the power generation is continued, the generated water quantity is also increased according to an increase in accumulated power generation quantity. Most of the generated water generated on the side of the cathode electrode of the membrane electrode assembly flows into the generated water storage tank from the cathode-side internal passage, and the remaining generated water is retained in the cathode-side internal passage. For this reason, the quantity of the generated water retained in the cathode-side internal passage can be ascertained by obtaining a difference between the quantity of the generated water estimated from the accumulated power generation quantity detected by the power generation quantity detection unit and the generated water quantity stored in the generated water storage tank. Accordingly, the flow direction of the oxygen gas is switched at a timing when the difference between the estimated quantity of the generated water and the generated water quantity in actuality detected by the generated water quantity detection device becomes the threshold or more, and thus retention of the generated water in the cathode-side internal passage can be efficiently suppressed.

(5) In the aspect of the above-mentioned (1) or (2), the fuel cell system may further include a power generation quantity detection unit (for example, a power generation quantity detection unit (50) of the embodiment) configured to detect an accumulated power generation quantity from a reference timing point; a first generated water storage tank (for example, a first gas-liquid separator (29) of the embodiment) provided in a second passage section (for example, a second passage section (26b) of the embodiment) of the gas circulation passage connected to the other end side of the cathode-side internal passage and configured to store the generated water flowing out of the cathode-side internal passage when oxygen gas circulates and flows through the gas circulation passage in one direction; a first generated water quantity detection device (for example, a water level sensor (35) of the embodiment) configured to detect a flow rate of the generated water stored in the first generated water storage tank; a second generated water storage tank (for example, a second gas-liquid separator (32) of the embodiment) provided in a first passage section (for example, a first passage section (26a) of the embodiment) of the gas circulation passage connected to one end side of the cathode-side internal passage and configured to store the generated water flowing out of the cathode-side internal passage when the oxygen gas circulates and flows through the gas circulation passage in the other direction; and a second generated water quantity detection device (for example, a water level sensor (36) of the embodiment) configured to detect a flow rate of the generated water stored in the second generated water storage tank, and in a case in which the oxygen gas circulates and flows through the gas circulation passage in the one direction, the control device may switch a flow of the oxygen gas by the gas circulation device to the other direction when a difference between a quantity of the generated water estimated from an accumulated power generation quantity detected by the power generation quantity detection unit and the generated water quantity detected by the first generated water quantity detection device becomes a threshold or more, and in a case in which the oxygen gas circulates and flows through the gas circulation passage in the other direction, the control device may switch a flow of the oxygen gas by the gas circulation device to the one direction when a difference between a quantity of the generated water estimated from an accumulated power generation quantity detected by the power generation quantity detection unit and the generated water quantity detected by the second generated water quantity detection device becomes a threshold or more.

In the case of the aspect of the above-mentioned (5), when the power generation is continued, the generated water quantity also increases according to an increase in accumulated power generation quantity. When the oxygen gas circulates and flows through the gas circulation passage in the one direction, most of the generated water on the side of the cathode electrode of the membrane electrode assembly flows into the first generated water storage tank from the cathode-side internal passage, and the remaining generated water is retained in the cathode-side internal passage. Meanwhile, when the oxygen gas circulates and flows through the gas circulation passage in the other direction, most of the generated water generated on the side of the cathode electrode of the membrane electrode assembly flows into the second generated water storage tank from the cathode-side internal passage, and the remaining generated water is retained in the cathode-side internal passage. For this reason, the flow direction of the oxygen gas is switched at a timing when the difference between the estimated quantity of the generated water and the generated water storage quantity of the generated water storage tank according to the flow direction of the oxygen gas has become the threshold or more, and thus retention of the generated water in the cathode-side internal passage can be efficiently suppressed.

(6) In the aspect of the above-mentioned (1) or (2), the fuel cell system may further include a voltage detection unit (for example, a voltage sensor (45) of the embodiment) configured to detect a voltage between the cathode electrode and the anode electrode, and the control device may switch a flow direction of the oxygen gas by the gas circulation device when the voltage detected by the voltage detection unit becomes lower than an assumed voltage according to an operation condition by a threshold or more.

In the case of the aspect of the above-mentioned (6), when the generated water is retained in the cathode-side internal passage, power generation efficiency in the membrane electrode assembly decreases according to the retention quantity of the generated water, and a voltage between the cathode electrode and the anode electrode decreases accordingly. For this reason, the flow direction of the oxygen gas is switched at the timing when the actual voltage detected by the voltage detection unit has become lower than an assumed voltage according to the operation condition by the threshold or more, and thus retention of the generated water in the cathode-side internal passage can be efficiently suppressed.

(7) In the aspect of any one of the above-mentioned (1) to (6), during stoppage of the fuel cell system, the control device may switch a flow direction of the oxygen gas by the gas circulation device in a state in which an output is suppressed more than during a normal operation.

In the case of the aspect of the above-mentioned (7), during stoppage of the fuel cell system, when the flow direction of the oxygen gas is switched in a state in which the output quantity is suppressed, the generated water retained on one side in the cathode-side internal passage is substantially uniformly diffused in the entire region of the cathode-side internal passage. As a result, the entire region of the cathode electrode of the membrane electrode assembly can be held at an appropriate humidity, and the next power generation can be smoothly performed.

In addition, an operating method of a fuel cell system according to another aspect of the present invention is an operating method of a fuel cell system, the fuel cell system including: a membrane electrode assembly (for example, a membrane electrode assembly (11) of the embodiment) having an anode electrode (for example, an anode electrode (11*b*) of the embodiment) joined to one surface of a solid polymer electrolyte membrane (for example, a solid polymer electrolyte membrane (11*a*) of the embodiment) and a cathode electrode (for example, a cathode electrode (11*c*) of the embodiment) joined to other surface of a solid polymer electrolyte membrane; an anode-side internal passage (for example, an anode-side internal passage (12) of the embodiment) facing the anode electrode of the membrane electrode assembly; a cathode-side internal passage (for example, a cathode-side internal passage (14) of the embodiment) facing the cathode electrode of the membrane electrode assembly; a hydrogen supply section (for example, a hydrogen supply section (3) of the embodiment) configured to supply hydrogen gas to the anode-side internal passage; and an oxygen supply section (for example, an oxygen supply section (4) of the embodiment) configured to supply oxygen gas to the cathode-side internal passage, and the fuel cell system being configured to generate electric power using an electrochemical reaction between hydrogen and oxygen passing through the membrane electrode assembly, the oxygen supply section has a gas circulation passage (for example, a gas circulation passage (26) of the embodiment) connected to one end side and other end side of the cathode-side internal passage; and an oxygen supply source (for example, an oxygen tank (24) of the embodiment) connected to the gas circulation passage, and the operating method of the fuel cell system includes switching a flow of the oxygen gas flowing through the gas circulation passage in a reverse direction according to a distribution state of moisture at the cathode electrode of the membrane electrode assembly.

In the fuel cell system according to the aspect of the present invention, since the control device switches the flow direction of the oxygen gas by the gas circulation device according to a distribution state of moisture on the cathode electrode of the membrane electrode assembly, biased retention of the generated water in the cathode-side internal passage can be suppressed.

In addition, in the operating method of the fuel cell system according to the other aspect of the present invention, since a flow of the oxygen gas flowing through the gas circulation passage is switched to a reverse direction according to the distribution state of the moisture on the cathode electrode of the membrane electrode assembly, biased retention of the generated water in the cathode-side internal passage can be suppressed.

DETAILED DESCRIPTION OF THE INVENTION

Hereinafter, an embodiment of the present invention will be described with reference to the accompanying drawings.

Figure 1:
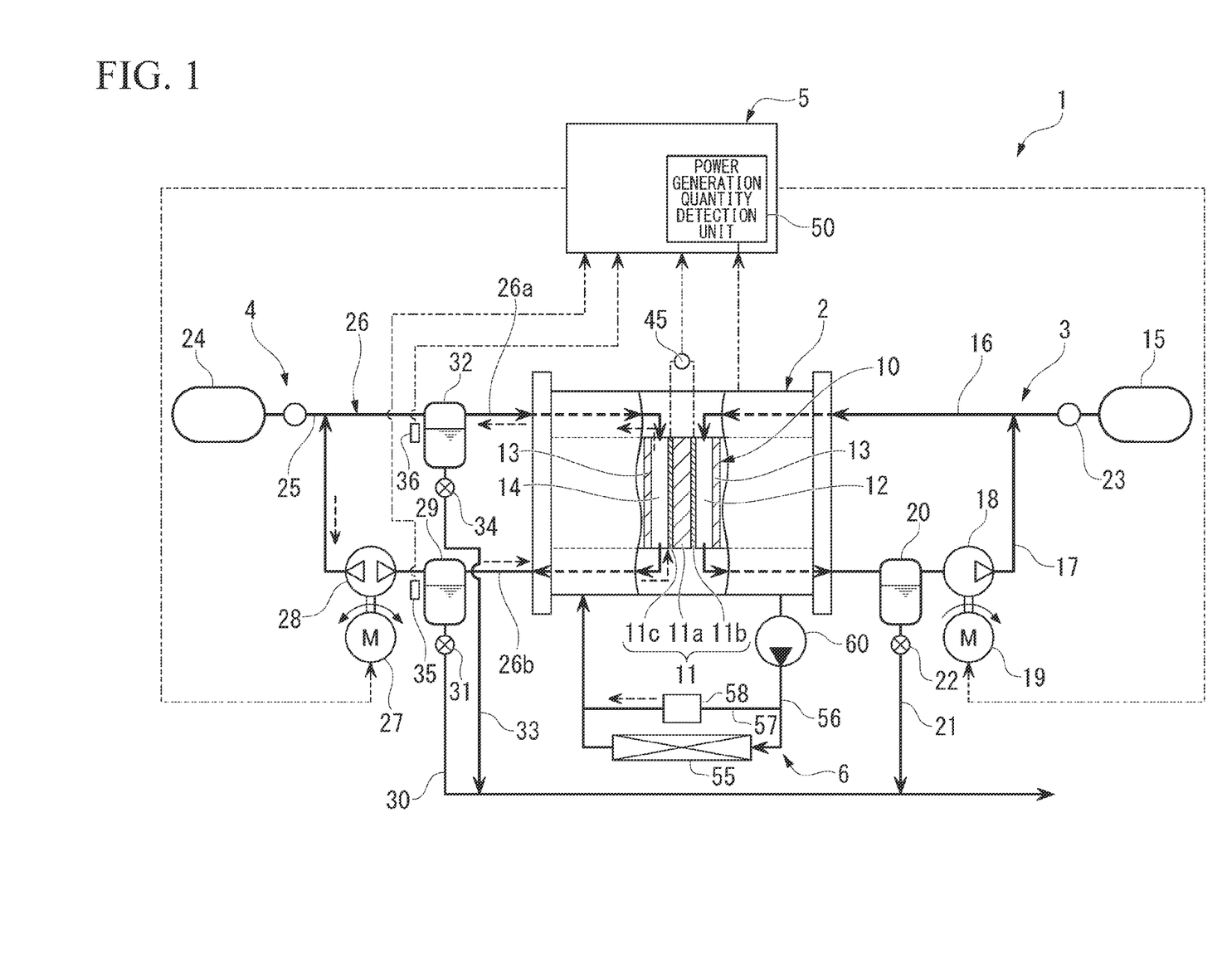
FIG. 1 is a configuration view of a fuel cell system of an embodiment as a whole.

FIG. 1 is a configuration view of a fuel cell system 1 of the embodiment as a whole.

The fuel cell system 1 includes a fuel cell stack 2 obtained by stacking a plurality of fuel cells 10, a hydrogen supply section 3 configured to supply hydrogen gas to each of the fuel cells 10 in the fuel cell stack 2, an oxygen supply section 4 configured to supply oxygen gas to each of the fuel cells 10 in the fuel cell stack 2, a control device 5 configured to control each of the fuel cell stack 2, the hydrogen supply section 3, and the oxygen supply section 4, and a cooling device 6 configured to cool the fuel cell stack 2.

Each of the fuel cells 10 of the fuel cell stack 2 is a solid polymer type fuel cell, and has a membrane electrode assembly (MEA) 11. The membrane electrode assembly 11 has a solid polymer electrolyte membrane 11a, an anode electrode 11b joined to one surface of the solid polymer electrolyte membrane 11a, and a cathode electrode 11c joined to the other surface of the solid polymer electrolyte membrane 11a. Each of the anode electrode 11b and the cathode electrode 11c is configured by joining a porous gas diffusion layer and a catalyst layer.

An anode-side internal passage 12 facing the anode electrode 11b is provided in the solid polymer electrolyte membrane 11a on the side of one surface. The anode-side internal passage 12 is formed between the anode electrode 11b and a separator 13. A cathode-side internal passage 14 facing the cathode electrode 11c is provided in the solid polymer electrolyte membrane 11a on the side of the other surface. The cathode-side internal passage 14 is formed between the cathode electrode 11c and the separator 13.

The hydrogen supply section 3 includes a hydrogen tank 15 (hydrogen supply source) filled with high pressure hydrogen gas, a supply passage 16 configured to supply the hydrogen gas flowing out of the hydrogen tank 15 to the anode-side internal passage 12 of each of the fuel cells 10 in the fuel cell stack 2, and a return passage 17 configured to return unreacted hydrogen gas that is not consumed by the membrane electrode assembly 11 to each of the fuel cells 10 to the supply passage 16. The return passage 17 is equipped with a pump device 18 configured to send the unreacted hydrogen gas to the supply passage 16. The pump device 18 is rotated and driven by an electric motor 19 in one direction. In addition, a gas-liquid separator 20 configured to separate moisture in the unreacted hydrogen gas discharged from the anode-side internal passage 12 from the gas is provided in the return passage 17 upstream from the pump device 18. The moisture separated by the gas-liquid separator 20 is temporarily stored in the gas-liquid separator 20 and discharged to the outside through a discharge passage 21 at an appropriate timing.

Further, reference sign 22 in the drawings designates an opening/closing valve provided in the discharge passage 21. The moisture temporarily stored in the gas-liquid separator 20 is discharged to the outside from the discharge passage 21 by opening the opening/closing valve 22. In addition, reference sign 23 in the drawings designates a closure valve configured to stop supply of the hydrogen gas from the hydrogen tank 15.

The oxygen supply section 4 includes an oxygen tank 24 (oxygen supply source) filled with high pressure oxygen gas, a supply passage 25 connected to the oxygen tank 24, and a gas circulation passage 26 connected to the supply passage 25. The gas circulation passage 26 has a first passage section 26a connected to one end side of the cathode-side internal passage 14 of each of the fuel cells 10 in the fuel cell stack 2, and a second passage section 26b connected to the other end side of the cathode-side internal passage 14 of each of the fuel cells 10, and an end portion of the second passage section 26b opposite to the fuel cell stack 2 (the cathode-side internal passage 14) is connected to the first passage section 26a. The oxygen gas introduced into the gas circulation passage 26 from the supply passage 25 is supplied to the cathode-side internal passage 14 of each of the fuel cells 10 through the first passage section 26a or the second passage section 26b of the gas circulation passage 26.

A pump device 28 that is rotatable in normal and reverse directions is provided in the second passage section 26b. The pump device 28 is driven by an electric motor 27 that is rotatable in normal and reverse directions. The pump device 28 that is rotatable in normal and reverse directions constitutes a gas circulation device configured to circulate and flow the oxygen gas in the gas circulation passage 26 in any one of the one direction and the other direction.

When the pump device 28 is driven in the one direction, the oxygen gas in the gas circulation passage 26 is supplied to one end side (an upper end side in FIG. 1) of the cathode-side internal passage 14 of each of the fuel cells 10 from the first passage section 26a. Here, most of the oxygen gas is subjected to an electrochemical reaction in the membrane electrode assembly 11 of each of the fuel cells 10, and the remaining oxygen gas (unreacted oxygen gas) is returned to the second passage section 26b from the other end side (a lower end side in FIG. 1) of the cathode-side internal passage 14.

In addition, when the pump device 28 is driven in the other direction, the oxygen gas in the gas circulation passage 26 is supplied to the other end side (a lower end side in FIG. 1) of the cathode-side internal passage 14 of each of the fuel cells 10 from the second passage section 26b. Here, most of the oxygen gas is subjected to an electrochemical reaction in the membrane electrode assembly 11 of each of the fuel cells 10, and the remaining oxygen gas (unreacted oxygen gas) is returned to the first passage section 26a from one end side (an upper end side in FIG. 1) of the cathode-side internal passage 14.

A first gas-liquid separator 29 configured to separate the moisture (generated water) in the unreacted oxygen gas discharged from the cathode-side internal passage 14 of each of the fuel cells 10 from the gas is provided in the second passage section 26b at a position closer to the fuel cell stack 2 than the pump device 28. The moisture separated by the first gas-liquid separator 29 is temporarily stored in the first gas-liquid separator 29 and discharged to the outside through a discharge passage 30 at an appropriate timing. When the oxygen gas circulates and flows through the gas circulation passage 26 in the one direction (a direction of a solid arrow in FIG. 1), the generated water discharged from the cathode-side internal passage 14 is stored in the first gas-liquid separator 29. In the embodiment, the first gas-liquid separator 29 constitutes a first generated water storage tank.

Further, reference sign 31 in the drawings designates an opening/closing valve provided in the discharge passage 30. The moisture temporarily stored in the first gas-liquid separator 29 is discharged to the outside from the discharge passage 30 by opening the opening/closing valve 31. In addition, reference sign 35 in the drawings designates a water level sensor configured to detect a water level (storage quantity) of the generated water stored in the first gas-liquid separator 29. Water level information (storage quantity information) detected by the water level sensor 35 is input to the control device 5. In the embodiment, the water level sensor 35 constitutes a detection device for a first generated water quantity.

In addition, a second gas-liquid separator 32 configured to separate the moisture (generated water) in the unreacted oxygen gas discharged from the cathode-side internal passage 14 of each of the fuel cells 10 from the gas is provided in the first passage section 26a. The moisture separated by the second gas-liquid separator 32 is temporarily stored in the second gas-liquid separator 32, and discharged to the outside through a discharge passage 33 at an appropriate timing. When the oxygen gas circulates and flows through the gas circulation passage 26 in the other direction (a direction of a dotted arrow in FIG. 1), the generated water discharged from the cathode-side internal passage 14 is stored in the second gas-liquid separator 32. In the embodiment, the second gas-liquid separator 32 constitutes a second generated water storage tank.

Reference sign 34 in the drawings designates an opening/closing valve provided in the discharge passage 33. The moisture temporarily stored in the second gas-liquid separator 32 is discharged to the outside from the discharge passage 33 by opening an opening/closing valve 34. Reference sign 36 in the drawings designates a water level sensor configured to detect a water level (storage quantity) of the generated water stored in the second gas-liquid separator 32. Water level information (storage quantity information) detected by the water level sensor 36 is input to the control device 5. In the embodiment, the water level sensor 36 constitutes a detection device for a second generated water quantity.

Information of the power generation quantity generated by the fuel cell stack 2 is input to the control device 5. The control device 5 includes a power generation quantity detection unit 50 configured to detect an accumulated power generation quantity from the reference timing. Further, the reference timing point when the accumulated power generation quantity is detected by the power generation quantity detection unit 50 is upon starting of power generation of the fuel cell stack 2 or upon switching of the rotation direction of the pump device 28 (upon switching of the flow direction of the oxygen gas by the gas circulation device).

In addition, a voltage sensor 45 (voltage detection unit) configured to detect a voltage between the cathode electrode 11c and the anode electrode 11b is provided on each of the fuel cells 10. Voltage information detected by each of the voltage sensor 45 is input to the control device 5.

A flow direction of the oxygen gas in the gas circulation passage 26 during the operation of the fuel cell system 1 is appropriately switched under the control by the control device 5. The control device 5 switches the rotation direction of the pump device 28 (the flow direction of the oxygen gas by the gas circulation device) according to the distribution state of the moisture of the cathode electrode 11c in the fuel cell 10. A specific switching technique of the circulation direction of the oxygen gas by the control device 5 will be described below in detail.

The cooling device 6 includes a main passage 56 connected to end portions of an inlet side and an outlet side of a cooling passage (not shown) in the fuel cell stack 2, a water pump 60 configured to send a cooling liquid to the main passage 56, a radiator 55 provided in the middle of the main passage 56, and a bypass passage 57 that bypasses an intervention section of the radiator 55 of the main passage 56. An opening/closing valve 58 is provided in the bypass passage 57.

In a state in which an ambient temperature is not lower than a prescribed temperature, the bypass passage 57 of the cooling device 6 is closed by the opening/closing valve 58. When the water pump 60 is operated in this state, cooling water flows through the radiator 55, the cooling liquid heat-exchanged with outdoor air in the radiator 55 flows through the cooling passage in the fuel cell stack 2. The cooling liquid flowing through the cooling passage in the fuel cell stack 2 is returned to the water pump 60 of the main passage 56. Here, the fuel cell stack 2 is cooled by the cooling liquid flowing through the cooling passage.

In addition, in a state in which the ambient temperature is equal to or lower than the prescribed temperature, the bypass passage 57 of the cooling device 6 is opened by the opening/closing valve 58. Accordingly, the cooling water sent by the water pump 60 bypasses the radiator 55 and flows into the cooling passage in the fuel cell stack 2. As a result, supercooling of the cooling water in cold weather is suppressed.

<Switching Technique 1 of Circulation Direction of Oxygen Gas>

Figure 2A:
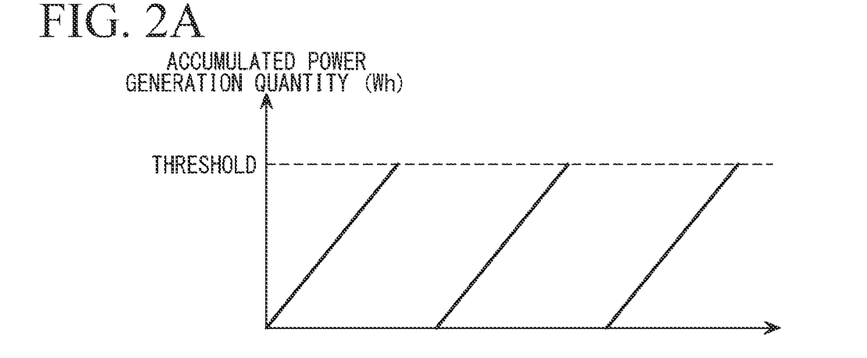
FIG. 2A is a timing diagram for describing a switching technique 1 of a circulation direction of oxygen gas.
Figure 2B:
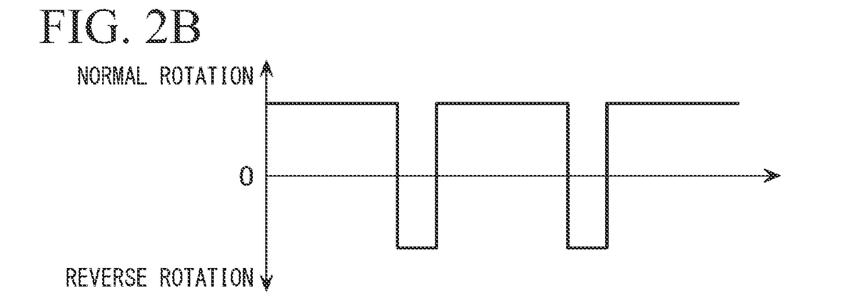
FIG. 2B is a timing diagram for describing the switching technique 1 of the circulation direction of the oxygen gas.

FIG. 2A and FIG. 2B are timing diagrams showing a change (FIG. 2A) of a generation quantity of the accumulated electric power from the reference timing point of the fuel cell stack 2 (the fuel cells 10) and a change (FIG. 2B) of the rotation direction of the pump device 28 of the oxygen supply section 4 together.

As shown in FIG. 2A and FIG. 2B, the control device 5 normally rotates the pump device 28 of the oxygen supply section 4 (rotated in one direction), and when an accumulated power generation quantity from a reference timing point reaches a threshold, reversely rotates the pump device 28 for a predetermined time (rotates in the other direction) and normally rotates the pump device 28 again when a predetermined time elapses. The control device 5 repeats this control during the operation of the system.

In this way, when the power generation by the fuel cell system 1 is performed, the generated water generated at the cathode electrode 11c of each of the fuel cells 10 is also increased according to an increase in accumulated power generation quantity in the fuel cell stack 2 (the fuel cells 10). For this reason, by normally rotating the pump device 28 and by reversely rotating the pump device 28 when the accumulated power generation quantity reaches the threshold, the generated water that has begun to be retained on one side (discharge side) of the cathode-side internal passage 14 of each of the fuel cells 10 flows through the cathode-side internal passage 14 in the reverse direction. As a result, the generated water is uniformly distributed in the cathode-side internal passage 14 of each of the fuel cells 10, humidity of the membrane electrode assembly 11 is appropriately held, and simultaneously, the generated water is avoided from being biased and retained on one side of the cathode-side internal passage 14.

<Switching Technique 2 of Circulation Direction of Oxygen Gas>

Figure 3A:
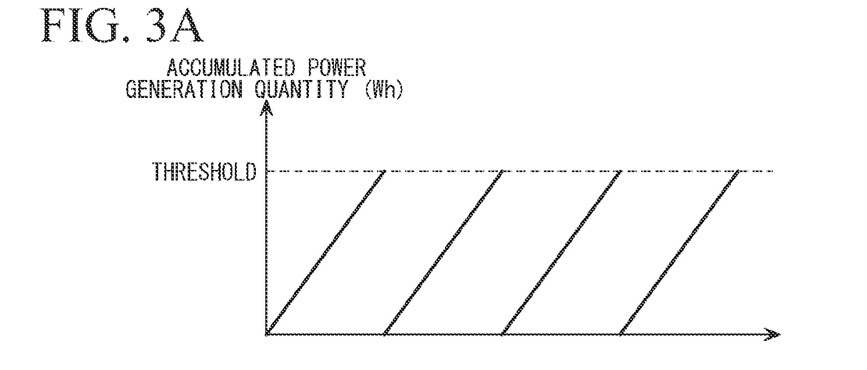
FIG. 3A is a timing diagram for describing a switching technique 2 of a circulation direction of oxygen gas.
Figure 3B:
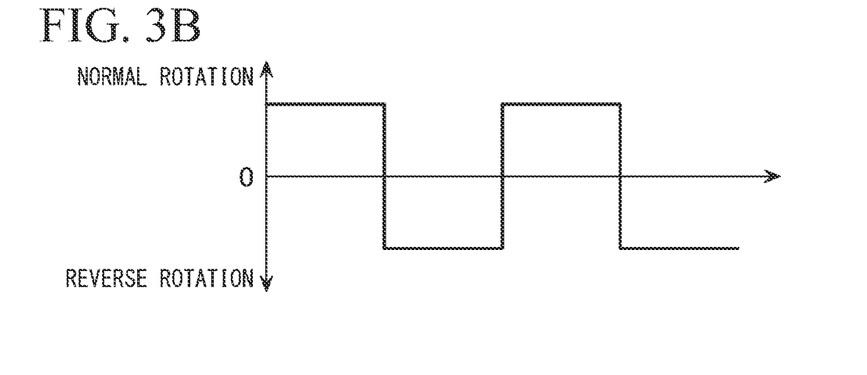
FIG. 3B is a timing diagram for describing the switching technique 2 of the circulation direction of the oxygen gas.

FIG. 3A and FIG. 3B are timing diagrams showing a change of an accumulated power generation quantity from a reference timing point of the fuel cell stack 2 (the fuel cells 10) (FIG. 3A) and a change of a rotation direction of the pump device 28 of the oxygen supply section 4 (FIG. 3B) together.

As shown in FIG. 3A and FIG. 3B, the control device 5 normally rotates the pump device 28 of the oxygen supply section 4 (rotates in one direction), and when the accumulated power generation quantity from the reference timing point reaches the threshold, reversely rotates the pump device 28 (rotates in the other direction). In a switching technique 1, the pump device 28 is normally rotated after the reverse rotation operation of the pump device 28 is performed for a fixed time (short time). On the other hand, in a switching technique 2, the power generation quantity detection unit 50 of the control device 5 starts detection of the accumulated power generation quantity upon starting of the reverse rotation operation of the pump device 28 as the reference timing point. Then, when the accumulated power generation quantity from the reference timing point reaches the threshold, the control device 5 switches the pump device 28 to an operation in the normal rotation direction. The control device 5 repeats the control during the operation of the system.

In this way, when the power generation by the fuel cell system 1 is performed, even in a case the oxygen gas flows through the gas circulation passage 26 in any one of the one direction and the other direction, a direction in which the oxygen gas flows is switched immediately before the generated water is retained more than necessary in the cathode-side internal passage 14 of each of the fuel cells 10. Accordingly, in the case in which the switching technique 2 is used, humidity of the membrane electrode assembly 11 can be more appropriately maintained while suppressing biased retention of the generated water in the cathode-side internal passage 14.

<Switching Technique 3 of Circulation Direction of Oxygen Gas>

Figure 4A:
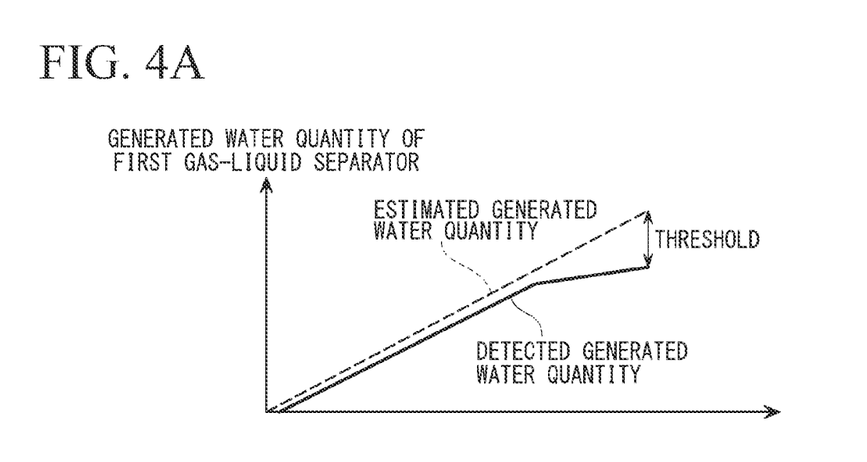
FIG. 4A is a timing diagram for describing a switching technique 3 of a circulation direction of oxygen gas.
Figure 4B:
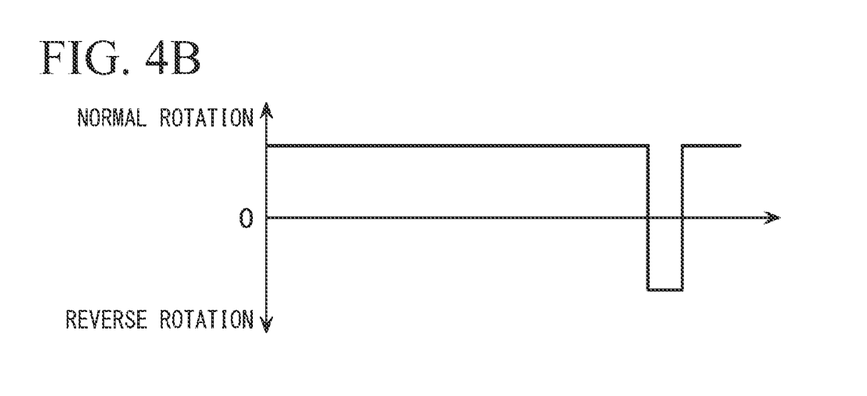
FIG. 4B is a timing diagram for describing the switching technique 3 of the circulation direction of the oxygen gas.

FIG. 4A and FIG. 4B are timing diagrams showing a separation situation of an estimated quantity of the generated water obtained from the accumulated power generation quantity and a quantity of generated water stored in the first gas-liquid separator 29 (FIG. 4A), and a change of a rotation direction of the pump device 28 of the oxygen supply section 4 (FIG. 4B) together.

In a switching technique 3, it is focused that, when the pump device 28 is normally rotated and power generation is continued, the generated water retained in the cathode-side internal passage 14 is gradually increased, and the quantity of the generated water stored in the first gas-liquid separator 29 is reduced actually to that extent.

As shown in FIG. 4A and FIG. 4B, the control device 5 normally rotates the pump device 28 of the oxygen supply section 4 (rotates in one direction), reversely rotates the pump device 28 (rotates in the other direction) when a difference (separation quantity) between the estimated quantity of the generated water obtained from the accumulated power generation quantity and the quantity of the generated water stored in the first gas-liquid separator 29 reaches the threshold, and normally rotates the pump device 28 again when a predetermined time elapses. The control device 5 repeats the control during the operation of the system.

In this way, when the power generation by the fuel cell system 1 is performed, a rotation direction of the pump device 28 (a flow direction of hydrogen gas) is switched using a parameter close to the generated water quantity retained in the cathode-side internal passage 14 in actuality. As a result, humidity of the membrane electrode assembly 11 is appropriately maintained, and biased retention of the generated water in the cathode-side internal passage 14 can be reliably suppressed.

<Switching Technique 4 of Circulation Direction of Oxygen Gas>

Figure 5A:
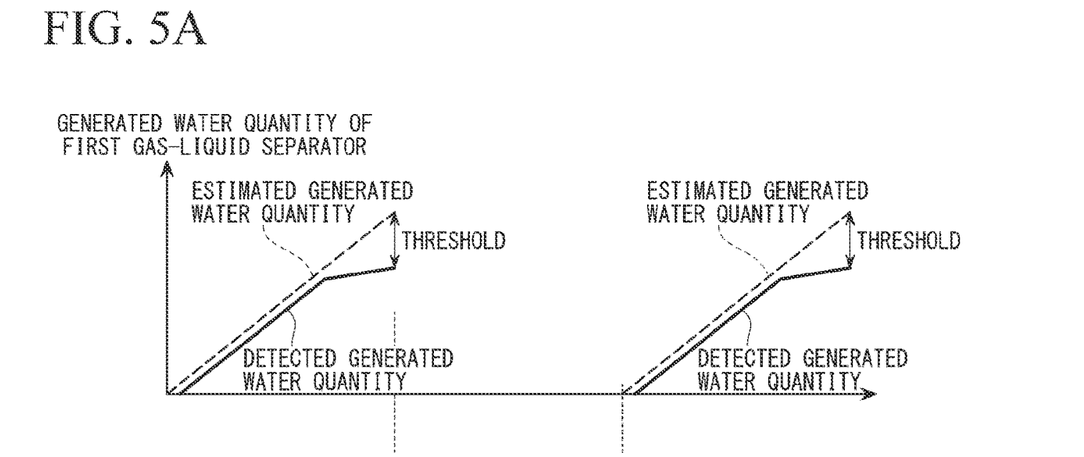
FIG. 5A is a timing diagram for describing a switching technique 4 of a circulation direction of oxygen gas.
Figure 5B:
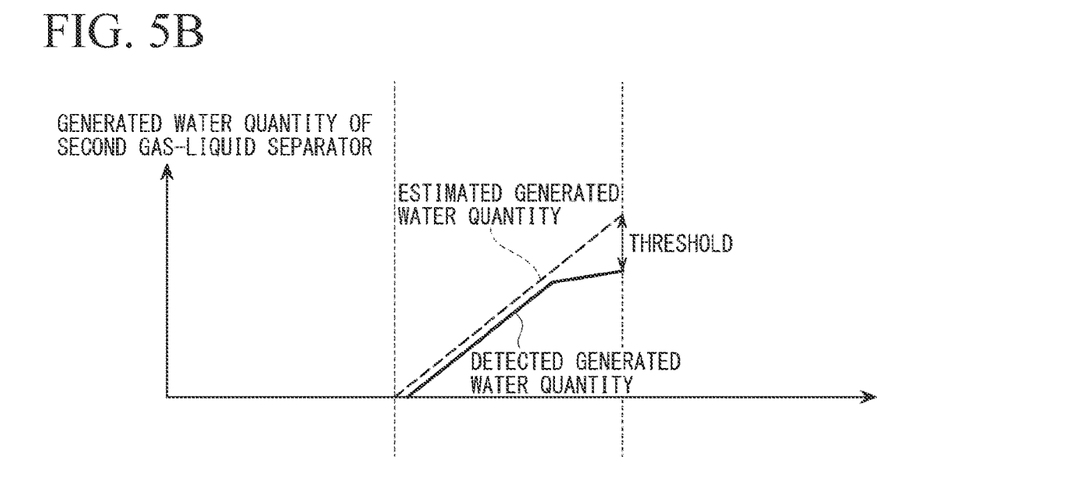
FIG. 5B is a timing diagram for describing the switching technique 4 of the circulation direction of the oxygen gas.
Figure 5C:
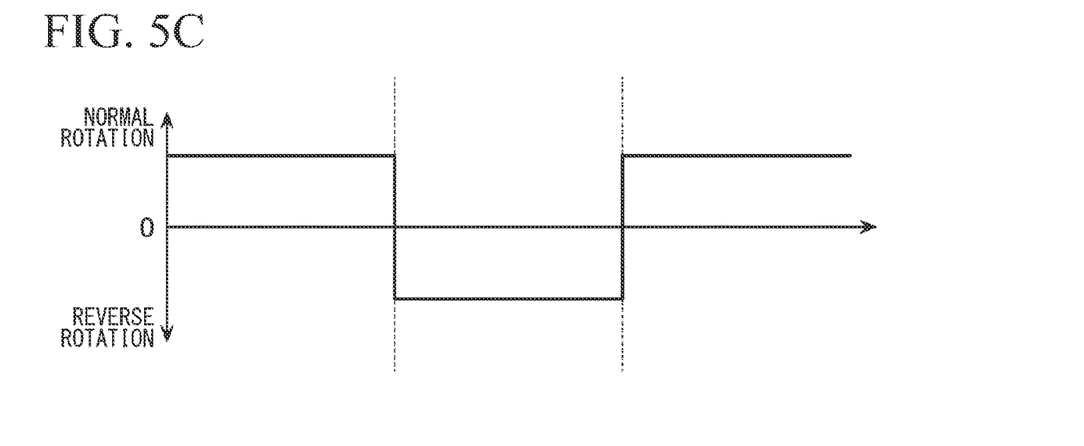
FIG. 5C is a timing diagram for describing the switching technique 4 of the circulation direction of the oxygen gas.

FIG. 5A, FIG. 5B and FIG. 5C are timing diagrams showing a separation situation of an estimated quantity of the generated water and the quantity of the generated water stored in the first gas-liquid separator 29 (FIG. 5A), a change of a rotation direction of the pump device 28 of the oxygen supply section 4 (FIG. 5B), and a separation situation of an estimated quantity of the generated water and the quantity of the generated water stored in the second gas-liquid separator 32 (FIG. 5C) together.

In a switching technique 4, in the case in which the pump device 28 is normally rotated, when a difference (separation quantity) between the estimated quantity of the generated water and the quantity of the generated water stored in the first gas-liquid separator 29 reaches the threshold, the pump device 28 is switched to the reverse rotation operation, and in the case in which the pump device 28 is reversely rotated, when a difference (separation quantity) between the estimated quantity of the generated water and the quantity of the generated water stored in the second gas-liquid separator 32 reaches the threshold, the pump device 28 is switched to the normal rotation operation. The control device 5 repeats the control during the operation of the system.

In this way, when the power generation by the fuel cell system 1 is performed, even though the oxygen gas flows through the gas circulation passage 26 in any one of the one direction and the other direction, the flow of the oxygen gas can be switched immediately before the generated water in the cathode-side internal passage 14 of each of the fuel cells 10 is retained more than necessary. Accordingly, when the switching technique 4 is used, humidity of the membrane electrode assembly 11 can be more appropriately maintained while suppressing biased retention of the generated water in the cathode-side internal passage 14.

<Switching Technique 5 of Circulation Direction of Oxygen Gas>

A switching technique 5 is a technique focusing that a voltage (cell voltage) between the cathode electrode 11c and the anode electrode 11b is decreased when the generated water in the cathode-side internal passage 14 is retained by a prescribed quantity or more during power generation.

The control device 5 switches an operation direction of the pump device 28 from the normal rotation direction to the reverse rotation direction or from the reverse rotation direction to the normal rotation direction when a cell voltage detected by the voltage sensor 45 becomes lower than the assumed voltage according to the operation condition by the threshold or more. The control device 5 repeats the control during the operation of the system.

In this way, when the power generation by the fuel cell system 1 is performed, humidity of the membrane electrode assembly 11 is also appropriately maintained while suppressing biased retention of the generated water in the cathode-side internal passage 14.

<Switching Technique 6 of Circulation Direction of Oxygen Gas>

Figure 6A:
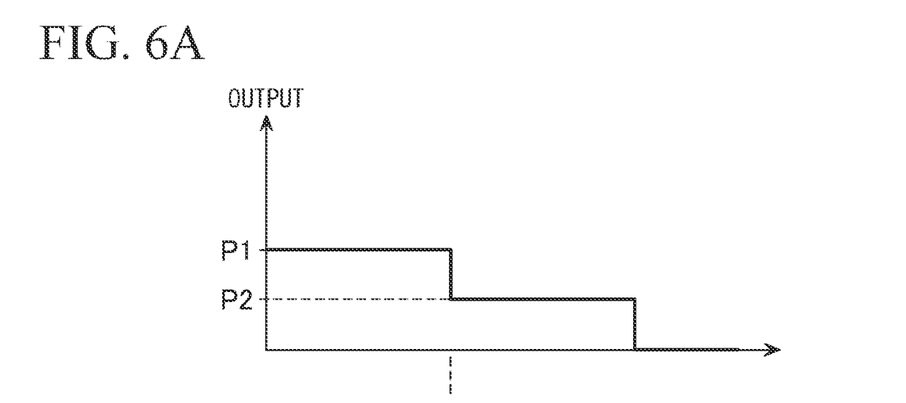
FIG. 6A is a timing diagram for describing a switching technique 6 of a circulation direction of oxygen gas.
Figure 6B:
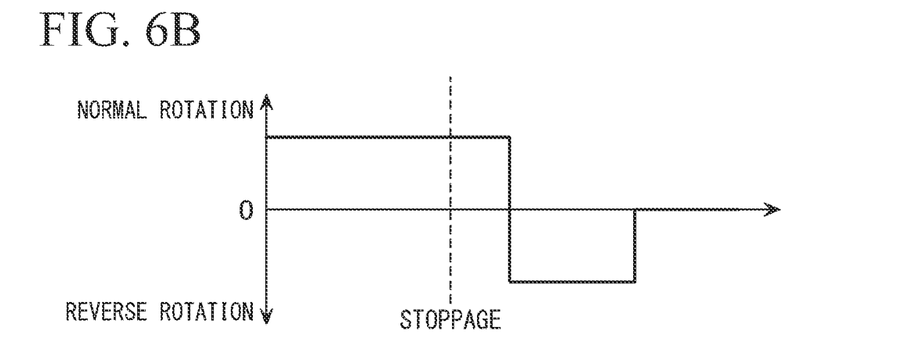
FIG. 6B is a timing diagram for describing the switching technique 6 of the circulation direction of the oxygen gas.

FIG. 6A and FIG. 6B are timing diagrams showing a change of output immediately before and after stoppage of the fuel cell system 1 (FIG. 6A) and a change of a rotation direction of the pump device 28 of the oxygen supply section 4 (FIG. 6B) together.

A switching technique 6 is a switching technique of a circulation direction of oxygen gas during stoppage of the fuel cell system 1.

The control device 5 switches a rotation direction of the pump device 28 (a flow direction of the oxygen gas) in a state in which an output P2 is more suppressed than an output P1 upon the normal operation during stoppage of the system. For example, if the pump device 28 is rotated in the normal rotation direction immediately before stoppage of the system, the output is decreased from P1 to P2 simultaneously with stoppage of the system, and the rotation direction of the pump device 28 is switched from the normal rotation direction to the reverse rotation direction after the predetermined time elapses.

Further, switching of the rotation direction of the pump device 28 during stoppage of the system may be performed simultaneously with stoppage of the system. In addition, the number of switches of the rotation direction of the pump device 28 after stoppage of the system is not limited to once and may be twice or more.

In this way, when the switching of the rotation direction of the pump device 28 (switching of the flow direction of the oxygen gas) is performed during stoppage of the fuel cell system 1, biased retention of the generated water in the cathode-side internal passage 14 after stoppage of the system is suppressed.

In the switching of the circulation direction of the oxygen gas other than when the fuel cell system 1 is stopped, any one of the switching techniques 1 to 5 may be employed.

Effects of Embodiment

In the fuel cell system 1 of the embodiment, since the control device 5 switches a flow direction of the oxygen gas using the pump device 28 (a gas circulation device) according to a distribution state of moisture at the cathode electrode 11c of the membrane electrode assembly 11, biases retention of the generated water in the cathode-side internal passage 14 can be suppressed.

Then, in the operating method of the above-mentioned fuel cell system 1, since a flow of the oxygen gas flowing through the gas circulation passage 26 is switched to a reverse direction according to the distribution state of the moisture on the cathode electrode 11c of the membrane electrode assembly 11, biased retention of the generated water in the cathode-side internal passage 14 can be suppressed.

In addition, in the fuel cell system 1 of the embodiment, the gas circulation device that circulates the oxygen gas is constituted by the pump device 28 that is rotatable normally and reversely. For this reason, by simply switching the rotation direction of the pump device 28, the flow direction of the oxygen gas in the cathode-side internal passage 14 can be changed. Accordingly, when the configuration is employed, the flow direction of the oxygen gas can be switched by a simple configuration and a structure of the oxygen supply section 4 can be simplified without using a complicate pipeline, a flow channel switching valve, or the like.

In addition, in the fuel cell system 1 according to the embodiment that employs the above-mentioned switching technique 1 or 2, when the accumulated power generation quantity from the reference timing point reaches the threshold or more, the control device 5 switches the direction of the flow of the oxygen gas by the pump device 28 (the gas circulation device). For this reason, biased retention of the generated water on one side of the cathode-side internal passage 14 can be suppressed under simple control by the control device 5.

In addition, in the fuel cell system 1 according to the embodiment that employs the above-mentioned switching technique 3, when the difference between the generated water quantity estimated from the accumulated power generation quantity detected by the power generation quantity detection unit 50 and the generated water quantity detected by the water level sensor 35 (a first generated water quantity detection device) becomes the threshold or more, the control device 5 switches the flow direction of the oxygen gas by the pump device 28 (the gas circulation device). For this reason, the flow direction of the oxygen gas is switched at the timing when the difference between the estimated quantity of the generated water and the actual the generated water quantity detected by the water level sensor 35 (the first generated water quantity detection device) has become the threshold or more, and thus, retention of the generated water in the cathode-side internal passage 14 can be efficiently suppressed. Accordingly, when the above-mentioned switching technique 3 is used, humidity of the membrane electrode assembly 11 can be more appropriately maintained while suppressing the biased retention of the generated water in the cathode-side internal passage 14.

In addition, in the fuel cell system 1 according to the embodiment that employs the above-mentioned switching technique 4, if the oxygen gas circulates and flows through the gas circulation passage 26 in the one direction, when the difference between the generated water quantity estimated from the accumulated power generation quantity detected by the power generation quantity detection unit 50 and the generated water quantity detected by the water level sensor 35 (the first generated water quantity detection device) becomes the threshold or more, the control device 5 switches the flow direction of the oxygen gas by the pump device 28 (the gas circulation device) to the other direction. In addition, if the oxygen gas circulates and flows through the gas circulation passage 26 in the other direction, when the difference between the generated water quantity estimated from the accumulated power generation quantity detected by the power generation quantity detection unit 50 and the generated water quantity detected by the water level sensor 36 (the second generated water quantity detection device) has become the threshold or more, the control device 5 switches the flow direction of the oxygen gas by the pump device 28 (the gas circulation device) to the one direction. For this reason, in the fuel cell system 1 of the embodiment, the flow direction of the oxygen gas is switched at the timing when the difference between the estimated quantity of the generated water and the generated water storage quantity of the gas-liquid separator (a generated water storage tank) according to the flow direction of the oxygen gas has become the threshold or more, and thus, retention of the generated water in the cathode-side internal passage 14 can be efficiently suppressed. Accordingly, when the above-mentioned switching technique 4 is used, humidity of the membrane electrode assembly 11 can be more appropriately maintained, and biased retention of the generated water in the cathode-side internal passage 14 can be suppressed.

Further, in the fuel cell system 1 according to the embodiment that employs the above-mentioned switching technique 5, when the cell voltage detected by the voltage sensor 45 (the voltage detection unit) becomes lower than the assumed voltage according to the operation condition by the threshold or more, the control device 5 switches the flow direction of the oxygen gas by the pump device 28 (the gas circulation device). For this reason, even when the above-mentioned switching technique 5 is used, the flow direction of the oxygen gas is switched at the timing when the actual voltage detected by the voltage sensor 45 becomes lower than the assumed voltage according to the operation condition by the threshold or more, and thus, retention of the generated water in the cathode-side internal passage 14 can be efficiently suppressed.

In addition, in the fuel cell system 1 according to the embodiment that employs the above-mentioned switching technique 6, during stoppage of the system, the control device 5 switches the flow direction of the oxygen gas by the pump device 28 (the gas circulation device) in a state in which the output is suppressed more than during the normal operation. For this reason, during stoppage of the system, by switching the flow direction of the oxygen gas in a state in which the output is suppressed, the generated water retained on one side in the cathode-side internal passage 14 can be diffused substantially uniformly in the entire region of the cathode-side internal passage 14. Accordingly, when the above-mentioned switching technique 6 is used, the entire region of the cathode electrode 11c of the membrane electrode assembly 11 is held at an appropriate humidity, and the next power generation can be smoothly started.

Further, the present invention is not limited to the above-mentioned embodiment, and various design modifications may be made without departing from the scope of the present invention.

For example, while the first gas-liquid separator 29 and the second gas-liquid separator 32 constitute the generated water storage tank in the above-mentioned embodiment, the generated water storage tank in which moisture (generated water) separated by the gas-liquid separator is stored may also be separately provided.

In addition, while the pump device 18 is employed as the device configured to return the hydrogen gas in the return passage 17 to the supply passage 16 in the hydrogen supply section 3 in the above-mentioned embodiment, an ejector may also be employed instead of the pump device 18.

In addition, while the oxygen tank 24 is employed as the oxygen supply source of the hydrogen supply section 3 in the above-mentioned embodiment, oxygen storage materials may also be used instead of the oxygen tank 24.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A fuel cell system comprising:
a membrane electrode assembly having an anode electrode joined to one surface of a solid polymer electrolyte membrane and a cathode electrode joined to other surface of the solid polymer electrolyte membrane;
an anode-side internal passage facing the anode electrode of the membrane electrode assembly;
a cathode-side internal passage facing the cathode electrode of the membrane electrode assembly;
a hydrogen supply section configured to supply hydrogen gas to the anode-side internal passage;
an oxygen supply section configured to supply oxygen gas to the cathode-side internal passage; and
a control device configured to control a flow of the oxygen gas in the oxygen supply section, and
the fuel cell system being configured to generate electric power using an electrochemical reaction between hydrogen and oxygen passing through the membrane electrode assembly,
wherein the oxygen supply section comprises:
a gas circulation passage connected to one end side and other end side of the cathode-side internal passage;
a first passage section connected to the one end side of the cathode-side internal passage;
a second passage section connected to the other end side of the cathode-side internal passage;
an oxygen supply source connected to the gas circulation passage; and
a gas circulation device configured to circulate and flow the oxygen gas in any of a first direction, wherein the first direction is a direction heading towards the one end side of the cathode-side internal passage from the first passage section, and a second direction, wherein the second direction is a direction heading towards the other end side of the cathode-side internal passage from the second passage section, in the gas circulation passage, and
wherein an end part of the second passage section which is located at an opposite side of the cathode-side internal passage is connected to the first passage section;
the gas circulation device comprises a pump device that is rotatable in both a forward direction and a reverse direction and that is provided in the second passage section; and
the control device switches a flow direction of the oxygen gas by the gas circulation device according to a distribution state of moisture at the cathode electrode of the membrane electrode assembly.

2. The fuel cell system according to claim 1, wherein the control device switches a flow direction of the oxygen gas by the gas circulation device when an accumulated power generation quantity from a reference timing point has become a threshold or more.

3. The fuel cell system according to claim 1, further comprising:
a power generation quantity detection unit configured to detect an accumulated power generation quantity from a reference timing point;
a generated water storage tank provided in the gas circulation passage and configured to store the generated water flowing out of the cathode-side internal passage; and
a generated water quantity detection device configured to detect a flow rate of the generated water stored in the generated water storage tank,
wherein the control device switches a flow direction of oxygen gas by the gas circulation device when a difference between a quantity of the generated water estimated from an accumulated power generation quantity detected by the power generation quantity detection unit and the generated water quantity detected by the generated water quantity detection device has become a threshold or more.

4. The fuel cell system according to claim 1, further comprising:
a power generation quantity detection unit configured to detect an accumulated power generation quantity from a reference timing point;
a first generated water storage tank provided in a second passage section of the gas circulation passage connected to the other end side of the cathode-side internal passage and configured to store the generated water flowing out of the cathode-side internal passage when oxygen gas circulates and flows through the gas circulation passage in the one direction;

a first generated water quantity detection device configured to detect a flow rate of the generated water stored in the first generated water storage tank;

a second generated water storage tank provided in a first passage section of the gas circulation passage connected to one end side of the cathode-side internal passage and configured to store the generated water flowing out of the cathode-side internal passage when the oxygen gas circulates and flows through the gas circulation passage in the other direction; and a second generated water quantity detection device configured to detect a flow rate of the generated water stored in the second generated water storage tank, wherein, in a case in which the oxygen gas circulates and flows through the gas circulation passage in the one direction, the control device switches a flow of the oxygen gas by the gas circulation device to the other direction when a difference between a quantity of the generated water estimated from an accumulated power generation quantity detected by the power generation quantity detection unit and the generated water quantity detected by the first generated water quantity detection device becomes a threshold or more, and in a case in which the oxygen gas circulates and flows through the gas circulation passage in the other direction, the control device switches a flow of the oxygen gas by the gas circulation device to the one direction when a difference between a quantity of the generated water estimated from an accumulated power generation quantity detected by the power generation quantity detection unit and the generated water quantity detected by the second generated water quantity detection device becomes a threshold or more.

5. The fuel cell system according to claim 1, further comprising a voltage detection unit configured to detect a voltage between the cathode electrode and the anode electrode, wherein the control device switches a flow direction of the oxygen gas by the gas circulation device when the voltage detected by the voltage detection unit becomes lower than an assumed voltage according to an operation condition by a threshold or more.

6. The fuel cell system according to claim 1, wherein, during stoppage of the fuel cell system, the control device switches a flow direction of the oxygen gas by the gas circulation device in a state in which an output is suppressed more than during a normal operation.

7. An operating method of a fuel cell system, the fuel cell system comprising:

a membrane electrode assembly having an anode electrode joined to one surface of a solid polymer electrolyte membrane and a cathode electrode joined to other surface of a solid polymer electrolyte membrane;

an anode-side internal passage facing the anode electrode of the membrane electrode assembly;

a cathode-side internal passage facing the cathode electrode of the membrane electrode assembly;

a hydrogen supply section configured to supply hydrogen gas to the anode-side internal passage;

an oxygen supply section configured to supply oxygen gas to the cathode-side internal passage; and a control device configured to control a flow of the oxygen gas in the oxygen supply section, wherein the fuel cell system being configured to generate electric power using an electrochemical reaction between hydrogen and oxygen passing through the membrane electrode assembly, the oxygen supply section comprising:

a gas circulation passage comprising a first passage section connected to a first end of the cathode-side internal passage and a second passage section connected to a second end of the cathode-side internal passage, wherein the first passage section and the second passage section are connected;

an oxygen supply source connected to the gas circulation passage; and a gas circulation device located in the second passage section, comprising a pump device operable in a forward gas feed direction and a reverse gas feed direction, and configured to circulate and flow the oxygen gas in at least one of:

a first direction heading towards the first end of the cathode-side internal passage from the first passage section, or a second direction heading towards the second end of the cathode-side internal passage from the second passage section, in the gas circulation passage; and the operating method of the fuel cell system comprising switching a flow of the oxygen gas flowing through the gas circulation passage in a reverse direction according to a distribution state of moisture at the cathode electrode of the membrane electrode assembly.

8. A fuel cell system comprising:

a membrane electrode assembly having an anode electrode joined to one surface of a solid polymer electrolyte membrane and a cathode electrode joined to other surface of the solid polymer electrolyte membrane;

an anode-side internal passage facing the anode electrode of the membrane electrode assembly;

a cathode-side internal passage facing the cathode electrode of the membrane electrode assembly;

a hydrogen supply section configured to supply hydrogen gas to the anode-side internal passage;

an oxygen supply section configured to supply oxygen gas to the cathode-side internal passage;

a control device configured to control a flow of the oxygen gas in the oxygen supply section;

a power generation quantity detection unit configured to detect an accumulated power generation quantity from a reference timing point;

a generated water storage tank provided in the gas circulation passage and configured to store the generated water flowing out of the cathode-side internal passage; and a generated water quantity detection device configured to detect a flow rate of the generated water stored in the generated water storage tank, and wherein, the fuel cell system is configured to generate electric power using an electrochemical reaction between hydrogen and oxygen passing through the membrane electrode assembly, wherein the oxygen supply section comprises:

a gas circulation passage connected to a first end of the cathode-side internal passage and a second end of the cathode-side internal passage;

an oxygen supply source connected to the gas circulation passage; and a gas circulation device located in the second passage section and configured to be operable in a forward gas feed direction and a reverse gas feed direction, and configured to circulate and flow the oxygen gas in at least one of:

a first direction heading towards the first end of the cathode-side internal passage from the first passage section, or a second direction heading towards the second end of the cathode-side internal passage from the second passage section, in the gas circulation passage; and wherein the control device switches flow of the oxygen gas by the gas circulation device from the first flow direction and the second flow direction according to a distribution state of moisture at the cathode electrode of the membrane electrode assembly, wherein the control device switches the flow direction of oxygen gas by the gas circulation device when a difference between a quantity of the generated water estimated from an accumulated power generation quantity detected by the power generation quantity detection unit and the generated water quantity detected by the generated water quantity detection device is equal or greater than a threshold amount.

* * * * *